(12) United States Patent
Ritter

(10) Patent No.: US 7,681,469 B2
(45) Date of Patent: Mar. 23, 2010

(54) DRIVE DEVICE

(75) Inventor: Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 356 days.

(21) Appl. No.: 11/473,252

(22) Filed: Jun. 22, 2006

(65) Prior Publication Data

US 2007/0062119 A1 Mar. 22, 2007

(30) Foreign Application Priority Data

Jun. 27, 2005 (DE) .................. 10 2005 030 052

(51) Int. Cl.
*F16H 3/06* (2006.01)
(52) U.S. Cl. ..................................... 74/89.23
(58) Field of Classification Search ............... 74/89.23, 74/89.4, 89.25, 89.26, 89.29, 89.33, 89
See application file for complete search history.

(56) References Cited

U.S. PATENT DOCUMENTS

| | | | | |
|---|---|---|---|---|
| 2,387,800 | A * | 10/1945 | Leland et al. ................. | 318/14 |
| 2,869,058 | A * | 1/1959 | Poland ........................ | 318/573 |
| 3,394,499 | A * | 7/1968 | Korthaus et al. .............. | 49/340 |
| 3,792,618 | A * | 2/1974 | Worrix ....................... | 74/89.23 |
| 4,747,319 | A | 5/1988 | Sakuta | |
| 4,836,338 | A * | 6/1989 | Taig .......................... | 188/72.1 |
| 5,169,084 | A * | 12/1992 | Potter et al. ............. | 242/596.6 |
| 5,199,764 | A * | 4/1993 | Robinson ............... | 297/362.11 |
| 5,983,743 | A * | 11/1999 | McGregor et al. ......... | 74/89.23 |
| 6,516,567 | B1 | 2/2003 | Stone et al. | |
| 6,829,935 | B1* | 12/2004 | Youells et al. ................ | 73/462 |
| 6,927,513 | B2 * | 8/2005 | Schreier ................... | 310/75 D |
| 2002/0066325 | A1* | 6/2002 | Roither et al. ............. | 74/89.23 |
| 2002/0197121 | A1* | 12/2002 | Mall ............................. | 409/9 |
| 2004/0188216 | A1* | 9/2004 | Yamazaki ................. | 192/84.6 |
| 2005/0211538 | A1* | 9/2005 | Krajci et al. ................ | 200/547 |

FOREIGN PATENT DOCUMENTS

DE 92 18 638 11/1994

(Continued)

OTHER PUBLICATIONS

Examination Report dated Feb. 14, 2006 for the corresponding German Application No. 10 2005 030 052.9-23.

*Primary Examiner*—Richard W L Ridley
*Assistant Examiner*—Alan B Waits
(74) *Attorney, Agent, or Firm*—Cohen Pontani Lieberman & Pavane LLP

(57) ABSTRACT

A drive device for moving a flap of a vehicle includes a first fastening element which can be connected to one of a moveable component and a fixed component, and a housing tube which is axially movable relative to the first fastening element. The housing tube has an end opposite the first fastening element which carries a second fastening element which can be connected to the other of the moveable component and the fixed component. A spindle drive includes a threaded spindle having end mounted for rotation in the housing tube and fixed against axial movement with respect to the housing tube, and a spindle nut arranged on the threaded spindle. The spindle nut is connected to the first fastening element and secured against rotation with respect to the housing tube, and a rotary drive is arranged to drive the spindle in rotation.

29 Claims, 6 Drawing Sheets

FOREIGN PATENT DOCUMENTS

| | | |
|---|---|---|
| DE | 9218638 | 11/1994 |
| EP | 0 647 799 | 10/1994 |
| EP | 0685662 | 12/1995 |
| GB | 593175 | 10/1947 |
| JP | 63154598 | 6/1988 |
| JP | 3272354 | 12/1991 |
| JP | 7174204 | 7/1995 |
| JP | 2004218720 | 8/2004 |

\* cited by examiner

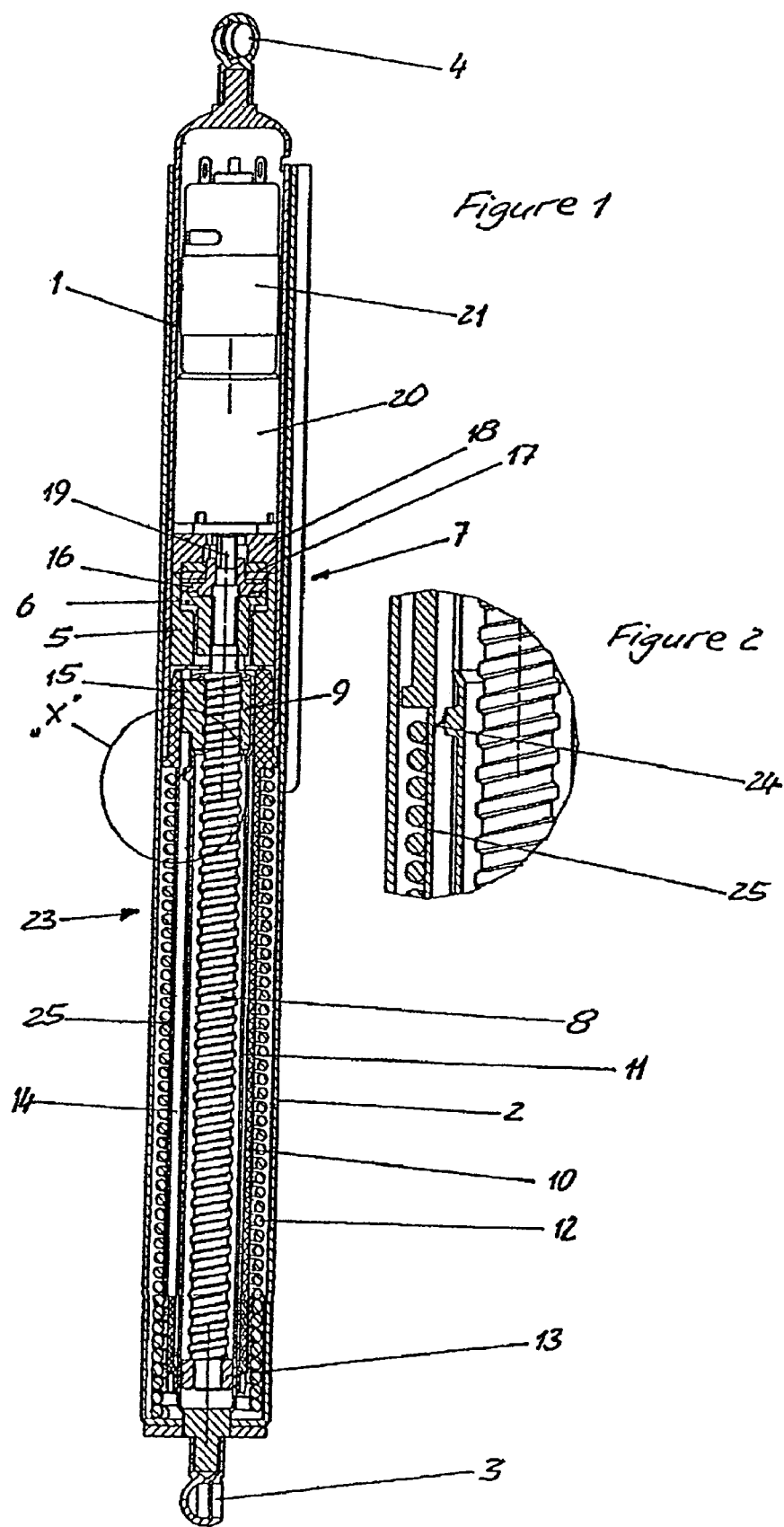

DRIVE DEVICE

BACKGROUND OF THE INVENTION

1. Field of the Invention

The invention relates to a drive device, in particular for a flap of a vehicle.

2. Description of the Related Art

A known drive device has a first fastening element which can be connected to a fixed component or to a moveable component and a housing tube which, at the end opposite the first fastening element, is moveable axially relative thereto and has a second fastening element which can be fastened to the moveable component or to the fixed component. The first fastening element and the housing tube can be driven in an axially moveable manner relative to each other by means of a spindle drive which has a threaded spindle and a spindle nut arranged on the threaded spindle, the spindle drive being drivable rotatably by a rotary drive.

In the case of drive devices of this type, it is known to design the fastening elements as fastening ears in order to support the moment of the spindle nut with respect to the moveable component and the fixed components.

However, this leads to a complicated installation of the drive device. It is therefore an object of the invention to provide a drive device of the type mentioned at the beginning which is of simple construction and can easily be fitted.

SUMMARY OF THE INVENTION

According to the invention, the threaded spindle is mounted rotatably at its one end on the housing tube and is arranged in an axially fixed manner with respect to the housing tube and can be driven rotatably by the rotary drive, and the spindle nut which is connected to the first fastening element is secured against rotation with respect to the housing tube.

This design leads to the moment of the spindle nut being supported within the drive device and not having to be supported on the moveable component and the fixed component via the fastening elements.

This makes it possible to fasten the drive device to the moveable component and the fixed component in any desired orientation, thus considerably simplifying the fitting of the drive device.

In a simple and easily producible manner, the housing tube can be a metal component, in particular aluminum component, which is produced by a forming process, such as, for example, deep-drawing.

In a simple manner, the spindle nut can be connected to one end of a spindle tube which surrounds the threaded spindle coaxially and at the other end of which the first fastening element is arranged fixedly.

The spindle tube may also be a metal component, in particular aluminum component which is produced by a forming process, such as, for example, deep-drawing.

The rotary drive is preferably an electric motor having an output shaft which drives the threaded spindle or a clutch component of a clutch rotatably.

To reduce the rotational speed and to increase the torque, the spindle drive can be driven rotatably by the rotary drive via a gear.

If the spindle drive can be driven rotatably by the rotary drive via a flexible shaft, then the rotary drive can be arranged at a spatially different point than the spindle drive.

However, for a compact design, the rotary drive and/or gear may also be arranged fixedly in the housing tube.

If the gear is a spur gear and/or an epicyclic gear, then only a low noise emission arises which is minimized even further if those stages of the gear which are in the vicinity of the rotary drive are designed as helical toothed stages.

A simple embodiment which can be fitted in any desired rotational position with respect to the longitudinal axis of the drive device is obtained if one or both of the fastening elements is or are a ball head or a ball socket of a ball-and-socket joint.

The force of the drive device is assisted and therefore the flap weight compensated for, and the rotary drive obtains small dimensions if the first fastening element is acted upon or can be acted upon by a spring force in the extension direction away from the housing tube.

This can take place over the entire adjusting stroke or else just over part of the adjusting stroke.

For this purpose, in a simple design, the first fastening element is acted upon by a compression spring, in particular a helical coil compression spring, supported on the housing tube.

As an alternative or in addition thereto, the first fastening element can also be acted upon by a gas pressure.

The force which is required to move the spindle manually is preferably selected precisely in such a manner that the flap can be held in intermediate positions when the rotary drive is deactivated. A currentless stop position can therefore be easily realized for an electromotive rotary drive.

If the stroke position of the spindle tube can be detected by a stroke-detecting sensor, then its output signals can be used in particular for synchronization in the case of parallel use of two drive devices on the flap. However, the movement position of the drive device can also be determined by the output signal.

In a simple design only requiring a little amount of construction space, the stroke-detecting sensor may be a linear potentiometer, the wiper of which is arranged on the spindle tube or on the housing tube and the wiper track of which is connected fixedly to the housing tube or the spindle tube.

To determine the movement speed, the movement position and the synchronization of parallel drive devices, the spindle revolutions can be detectable by a spindle sensor.

In this case, the spindle sensor is preferably a Hall sensor which is connected fixedly to the housing tube and opposite which is arranged an annular magnet connected fixedly to the threaded spindle, which leads to a simple configuration.

For the same purpose, the motor revolutions or the gear revolutions or clutch revolutions can also be detectable by a drive sensor.

In a simple design saving on construction space, the drive sensor is a fixed Hall sensor which, in particular, is connected fixedly to the housing tube and opposite which is arranged an annular magnet connected fixedly to the output shaft of the rotary drive or to a gear part or to a clutch part.

To decouple the rotary drive from the spindle drive, the spindle drive can be drivable rotatably by the rotary drive via an openable clutch.

This clutch may be a positive or a frictional clutch.

For engagement and disengagement purposes, the clutch may be a switchable clutch, in particular switchable magnetic clutch.

However, a special clutch drive may be omitted if the clutch is a clutch which is open when the drive device is unloaded or is loaded in the extension direction and which can be closed by loading the drive device in the retraction direction.

This leads in a simple manner to manual moveability with comfortable manual forces in the traction direction of the drive device, since the rotary drive and, if appropriate, the gear then cannot act on the spindle in a locking manner.

Since no tensile forces can be transmitted, an optimum obstacle recognition and cut-off in the event of an obstacle furthermore arise during the closing of the flap.

The compensating of the flap weight is preferably to be configured in such a manner that a resulting moment always acts in the closing direction. This means that the drive device always has to be able to open the flap by motor. To close it, the flap just has to be lowered at a defined speed.

A guide tube surrounding the spindle tube with a clearance can be arranged on the housing tube.

If the helical coil compression spring surrounds the guide tube with a clearance and is surrounded, likewise with a clearance, by an overtube connected to the first fastening element, then the helical coil compression spring is both guided and protected radially inwards and outwards.

The components of the drive device are protected against soiling and damage by the housing tube and the overtube being displaceable telescopically one inside the other.

The guide tube can have a radially continuous axial slot through which the wiper, which is arranged fixedly on the spindle tube, protrudes to the wiper track arranged fixedly on the guide tube, and/or into which a radially directed supporting pin of the spindle nut protrudes, as a result of which the moment of the spindle nut is supported in a simple manner.

For easy manual operability with good efficiency, the threaded spindle is a multi-threaded spindle with, preferably, a pitch of >10 mm.

A slim embodiment is obtained if the components rotary drive and/or gear and/or clutch and/or spindle drive are arranged in a series arrangement with respect to one another.

If the components rotary drive and/or gear and/or clutch and/or spindle drive are arranged in a parallel arrangement with respect to one another, then a design which is not as slim but is shorter is possible.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 shows a cross section of a first exemplary embodiment of a drive device;

FIG. 2 shows an enlarged detail "X" of the drive device according to FIG. 1;

DETAILED DESCRIPTION OF THE PRESENTLY PREFERRED EMBODIMENTS

Figure 3:
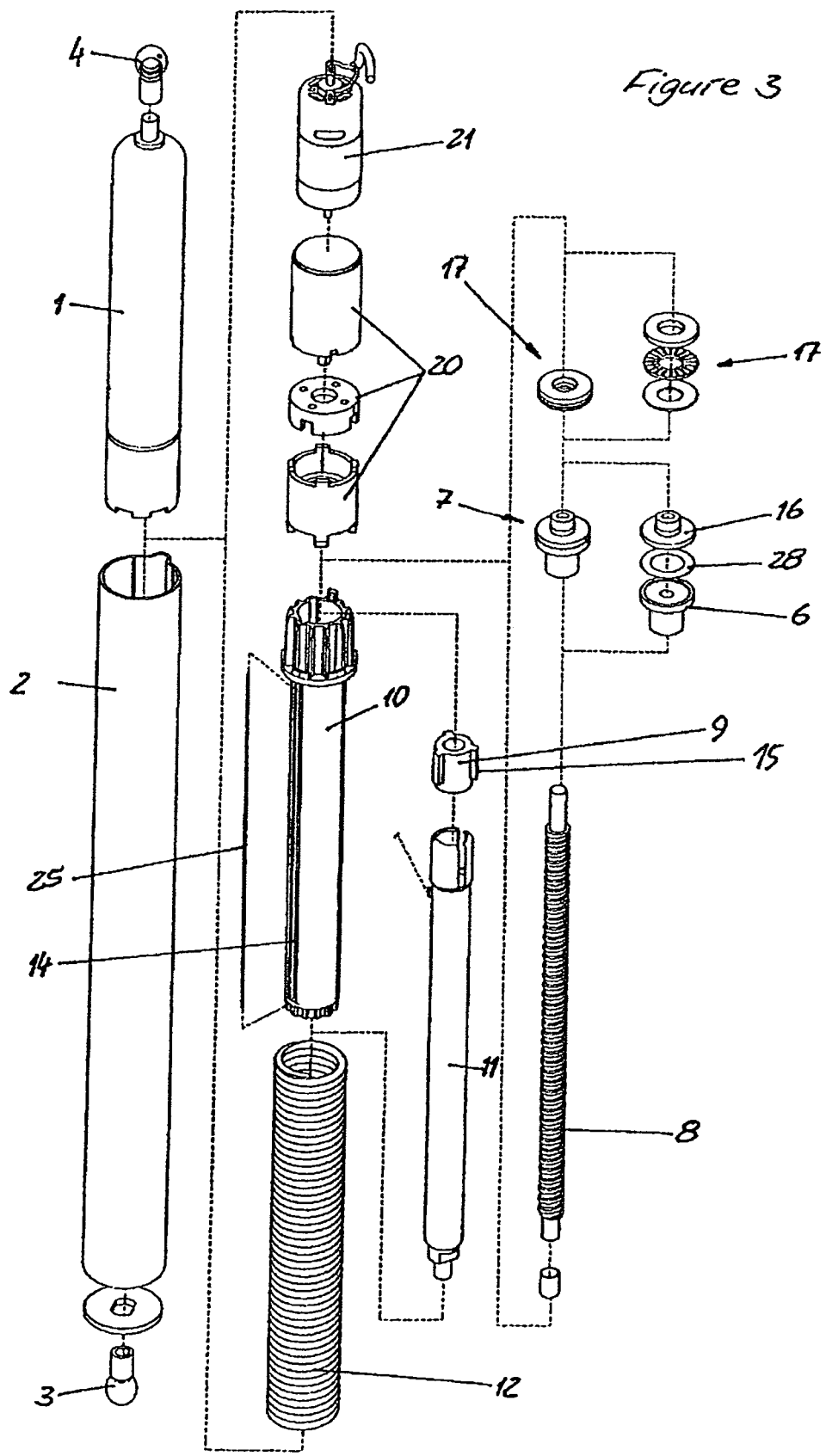
FIG. 3 shows a perspective exploded illustration of the drive device according to FIG. 1.
Figure 4:
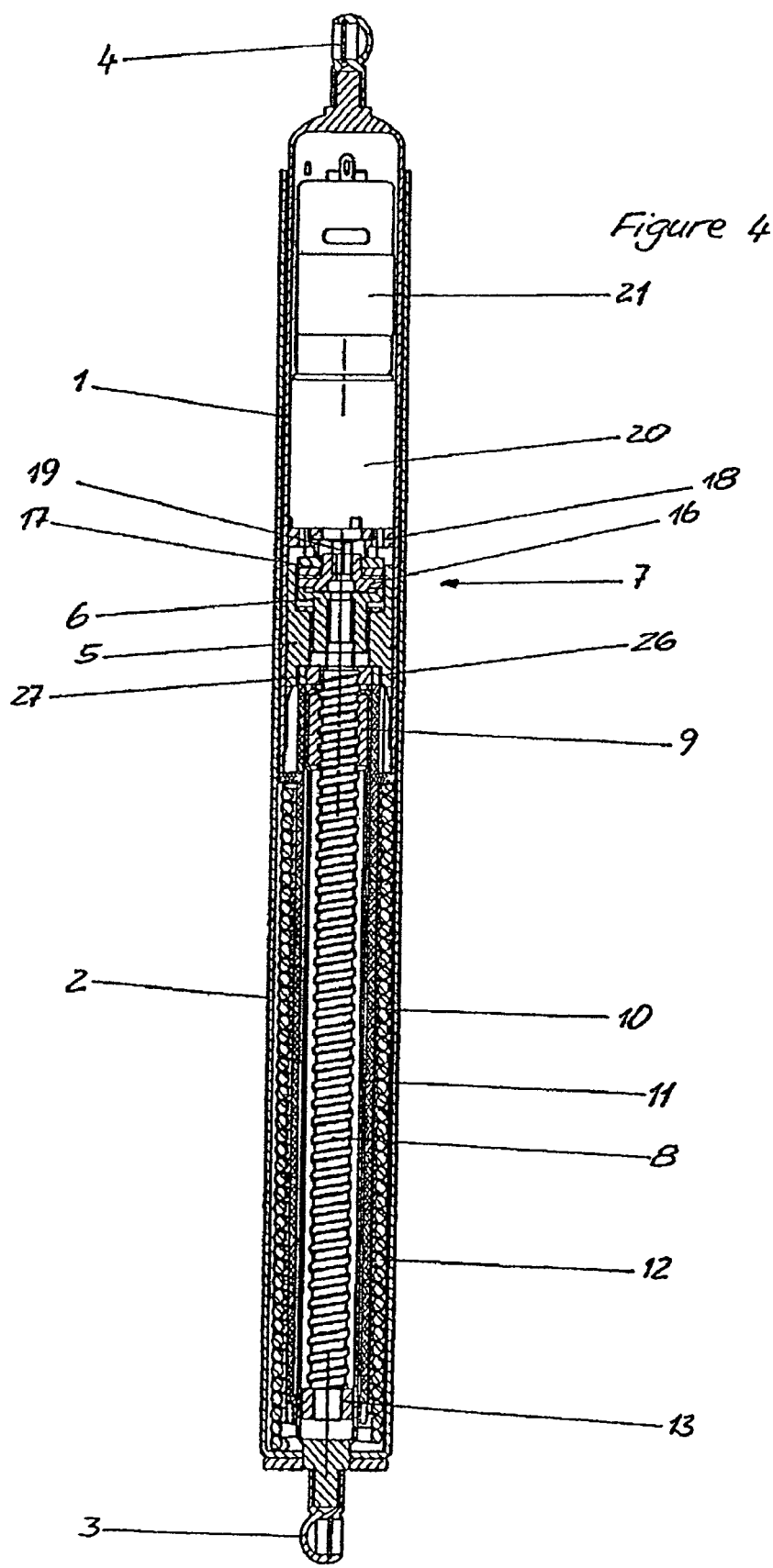
FIG. 4 shows a cross section of a second exemplary embodiment of a drive device.
Figure 5:
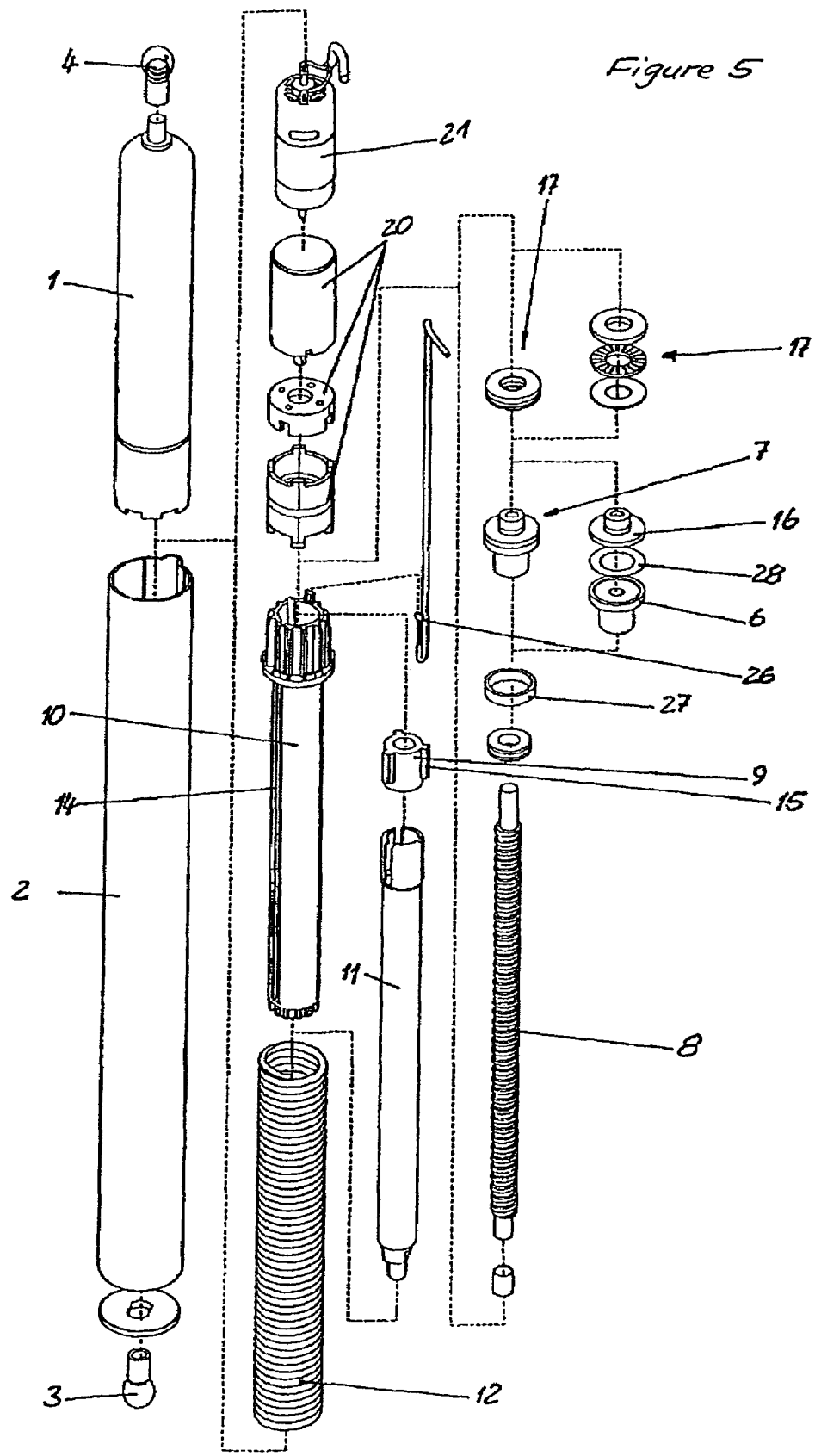
FIG. 5 shows a perspective exploded illustration of the drive device according to FIG. 4.

The drive devices illustrated in the figures have a housing tube 1 on which an overtube 2 is guided in a telescopically displaceable manner.

A first ball socket 3 is arranged at that end of the overtube 2 which is opposite the housing tube 1, and a second ball socket 4 is arranged at that end of the housing tube 1 which is opposite the overtube 2. The ball sockets are used to connect the drive device in an articulated manner to a fixed body component of a motor vehicle and to a moveable component of the motor vehicle, which component is designed as a flap.

A first bearing part 5 is inserted fixedly in that end region of the housing tube 1 which faces the overtube 2, and a first clutch part of a frictional clutch 7 is mounted rotatably in this bearing part 5. This clutch part 6 sits fixedly on an end of a threaded spindle 8 protruding into the overtube 2.

A spindle nut 9 is arranged in a rotationally fixed manner with respect to the housing tube 1 on the threaded spindle 8.

The spindle nut 9 is connected to one end of a spindle tube 11 which surrounds the threaded spindle 8 coaxially. The other end of the spindle tube 11 is fixed to the first ball socket 3.

The spindle nut 9 is guided in an axially displaceable manner in a guide tube 10 which surrounds the spindle tube 11 and is connected fixedly to the housing tube 1.

A helical coil compression spring 12 is arranged in the annular gap between the guide tube 10 and the overtube 2, which surround the latter with a clearance, the helical coil compression spring being supported at its one end on the overtube 2 in the region of the first ball socket 3 and being supported at its other end on the housing tube 1.

At its end facing away from the first clutch part 6, the threaded spindle 8 bears a guide sleeve 13 with the cylindrical circumferential surface of which the threaded spindle 8 is guided in an axially displaceable manner in the spindle tube 11.

The guide tube 10 has three axial slots 14 which are distributed uniformly on the circumference and extend substantially over its length.

Corresponding to the axial slots 14, radially protruding supporting pins 15 are arranged on the spindle nut 9, project into the axial slots 14 and ensure that the spindle nut 9 is secured against rotation with respect to the guide tube 10. Coaxially opposite the first clutch part 6, a second clutch part 16 is arranged in the housing tube 1, with there being an annular friction lining 28 between the two clutch parts 6 and 16.

Via an axial bearing 17, the second clutch part 16 is supported axially by its side facing away from the first clutch part 6 on an abutment part 18 arranged fixedly in the housing tube 1.

The first clutch part 6 and the second clutch part 16 have such a movement clearance between them that they can move axially away from each other releasing a frictional connection.

An output shaft 19 of a gear 20, in particular multi-stage gear, is connected coaxially in a rotationally fixed manner to the second clutch part 16, with the gear 20 being drivable rotatably by an electric motor 21.

In the case of the exemplary embodiments of FIGS. 1 to 5, gear 20 and electric motor 21 are arranged coaxially with respect to the clutch 7 in the housing tube 1.

Figure 6:
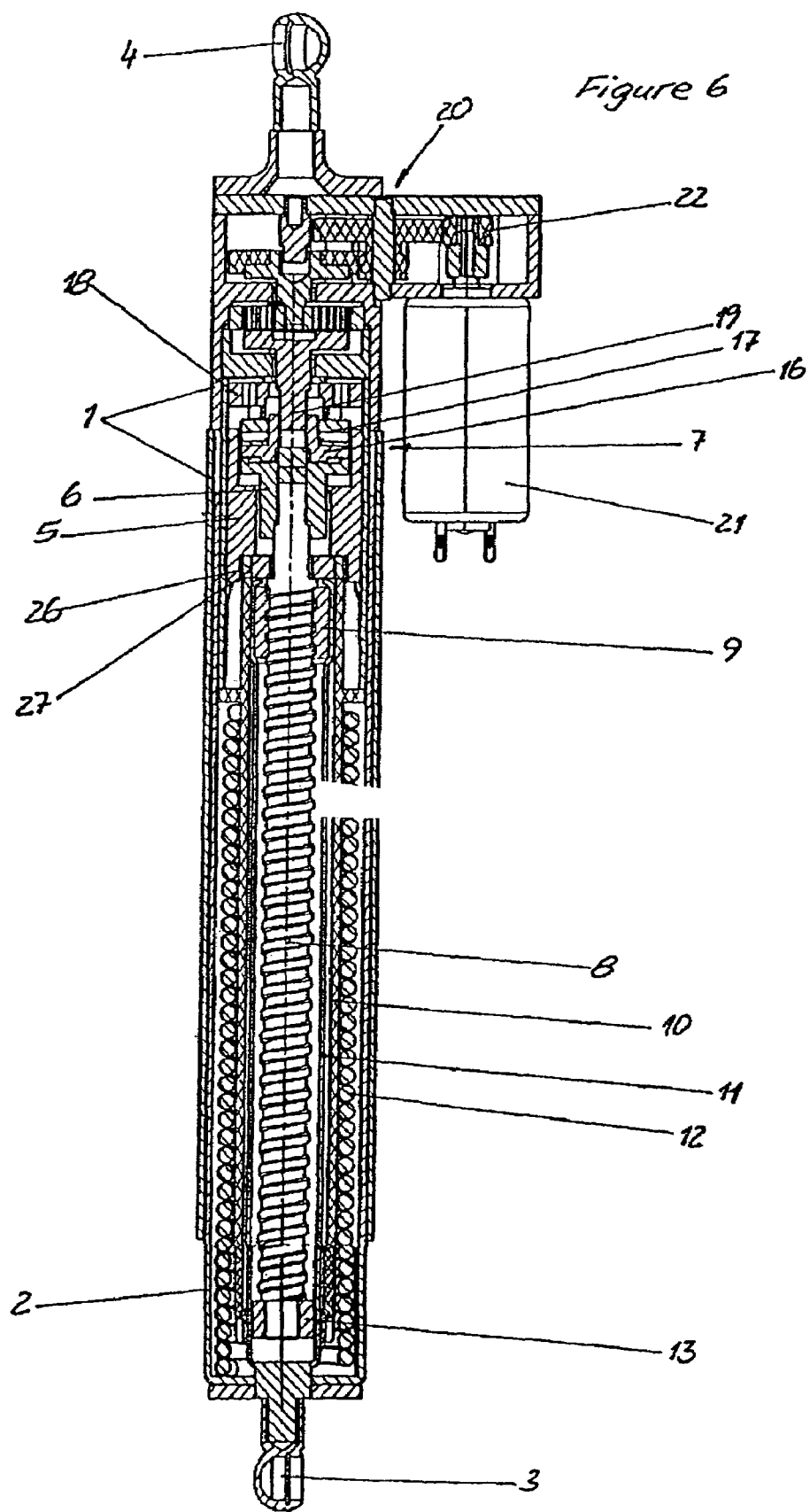
FIG. 6 shows a cross section of a third exemplary embodiment of a drive device.
Figure 7:
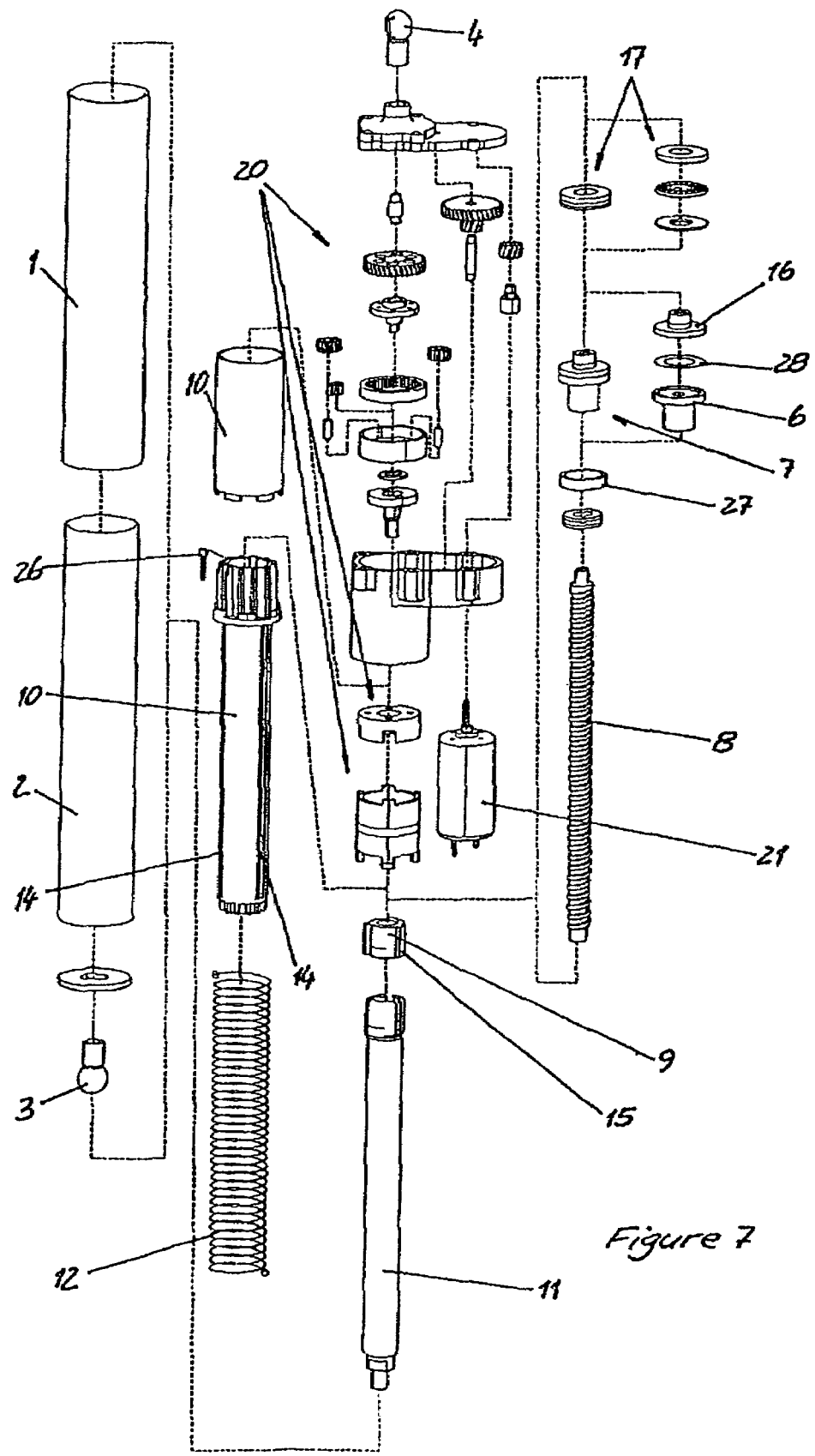
FIG. 7 shows a perspective exploded illustration of the drive device according to FIG. 6.

In the case of the exemplary embodiment of FIGS. 6 and 7, the electric motor 21 is arranged parallel next to the housing tube 1, the rotational movement of the output pinion 22 of the electric motor 21 being transmitted by the gear 20 into the housing tube 1 in order there to be transmitted by the output shaft 19 of the gear 20 to the second clutch part 16.

As can be seen in particular in FIG. 2, the exemplary embodiment of FIGS. 1 to 3 has a stroke-detecting sensor designed as a linear potentiometer 23.

For this purpose, a wiper 24 is arranged on the spindle tube 11 in the vicinity of the spindle nut 9, which wiper protrudes through one of the axial slots 14 and is moveable with the spindle nut 9 and the spindle tube 11 along a wiper track 25 which extends over this axial slot 14 along its outside.

In the case of the exemplary embodiments of FIGS. 4 to 7, a spindle sensor is provided which has a Hall sensor 26 which is arranged in the guide tube 10 and which lies radially opposite an annular magnet 27 which is connected fixedly to the threaded spindle 8.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive device for driving a moveable component relative to a fixed component, said device comprising:
    a first fastening element which can be connected to one of said moveable component and said fixed component;
    a housing tube which is axially movable relative to said first fastening element, said housing tube having an end opposite said first fastening element which carries a second fastening element which can be connected to the other of said moveable component and said fixed component;
    an overtube configured to telescopically receive the axially displaceable housing tube at a first end;
    a guide tube having at least one axial slot, the guide tube arranged coaxially with the overtube at a second end of the overtube, the guide tube being axially and rotationally fixed to the housing;
    a threaded spindle having one end mounted for rotation in the housing tube and fixed against axial movement with respect to the housing tube;
    a spindle tube configured to coaxially surround the threaded spindle, a diameter of the spindle tube being smaller than a diameter of the guide tube, the spindle tube configured for axial displacement in the guide tube;
    a spindle nut arranged on the threaded spindle, said spindle nut being connected to the first fastening element and secured against rotation with respect to the housing tube, the spindle nut being guided by at least one element protruding radially into the at least one axial slot; and
    a rotary drive which can drive said spindle in rotation.

2. The drive device of claim 1, wherein said spindle tube has one end connected to the spindle nut and another end fixed to the first fastening element.

3. The drive device of claim 2 further comprising a stroke-detection sensor which detects a stroke position of the spindle tube.

4. The drive device of claim 3 wherein the stroke-detection sensor is a potentiometer comprising a wiper arranged on one of the spindle tube and the housing tube, and a wiper track fixed to the other of the spindle tube and the housing tube.

5. The drive device of claim 2 wherein the guide tube is arranged on the housing tube and surrounds the spindle tube with a clearance.

6. The drive device of claim 5 further comprising:
    a helical compression spring which loads the first fastening element away from the housing tube, said spring surrounding the guide tube with a clearance; and
    wherein the overtube is connected to the first fastening element and surrounds the spring with a clearance.

7. The drive device of claim 5 wherein the at least one element of the spindle nut is a radially projecting pin.

8. The drive device of claim 5 further comprising a potentiometer having a wiper fixed on the spindle tube, and a wiper track fixed to the housing tube, the guide tube having an axial slot through which the wiper protrudes.

9. The drive device of claim 1 wherein said rotary drive is an electric motor having an output shaft which can drive said spindle in rotation.

10. The drive device of claim 1 further comprising a flexible shaft, said spindle being rotated by the rotary drive via said flexible shaft.

11. The drive device of claim 1 further comprising a gear, said spindle being rotated by the rotary drive via said gear.

12. The drive device of claim 11 wherein at least one of said rotary drive and said gear are fixed in said housing tube.

13. The drive device of claim 11 wherein the gear comprises at least one of a spur gear and an epicyclic gear.

14. The drive device of claim 11 wherein the gear has stages with helical teeth in the vicinity of the rotary drive.

15. The drive device of claim 1 wherein at least one of said fastening elements is one of a ball and a socket of a ball and socket joint.

16. The drive device of claim 1 wherein the first fastening element is spring loaded away from the housing tube.

17. The drive device of claim 16 further comprising a helical compression spring which loads the first fastening element away from the housing tube.

18. The drive device of claim 16 further comprising a compressed gas which loads the first fastening element away from the housing tube.

19. The drive device of claim 1 further comprising a spindle sensor which can detect the number of revolutions of the spindle.

20. The drive device of claim 19 wherein the spindle sensor comprises a Hall sensor fixed to the housing tube and an annular magnet fixed to the threaded spindle.

21. The drive device of claim 1 further comprising a drive sensor which detects one of motor revolutions, gear revolutions, and clutch revolutions.

22. The drive device of claim 21 wherein the drive sensor comprises a Hall sensor fixed to the housing tube and an annular magnet fixed to one of an output shaft of the rotary drive, a gear part, and a clutch part.

23. The drive device of claim 1 further comprising an openable clutch, said spindle being rotated by the rotary drive via said openable clutch.

24. The drive device of claim 23 wherein said clutch is one of a positive clutch and a frictional clutch.

25. The drive device of claim 23 wherein said clutch is a switchable magnetic clutch.

26. The drive device of claim 23 wherein said clutch is open when the first fastening element is unloaded or is loaded in an extension direction with respect to the housing tube, and is closed when the first fastening element is loaded in a retraction direction with respect to the housing tube.

27. The drive device of claim 1 wherein the spindle has multiple threads.

28. The drive device of claim 1 further comprising a gear and a clutch arranged between the rotary drive and the spindle, wherein the rotary drive, the gear, the clutch, and the spindle are arranged in axial series.

29. The drive device of claim 1, further comprising a spring supported at its ends by the guide tube and the overtube.

* * * * *